United States Patent
Smoot

(10) Patent No.: US 6,209,614 B1
(45) Date of Patent: Apr. 3, 2001

(54) SCREEN ASSEMBLY FOR DOOR OPENING

(75) Inventor: Stevan A. Smoot, El Cajon, CA (US)

(73) Assignee: Best R.V., Inc., Santee, CA (US)

( * ) Notice: Subject to any disclaimer, the term of this patent is extended or adjusted under 35 U.S.C. 154(b) by 0 days.

(21) Appl. No.: 09/427,399

(22) Filed: Oct. 25, 1999

(51) Int. Cl.[7] .................................................. A47H 23/00
(52) U.S. Cl. ....................... 160/237; 160/243; 160/368.1
(58) Field of Search ................................... 160/123, 124, 160/237, 243, 330, 332, 368.1, DIG. 18

(56) References Cited

U.S. PATENT DOCUMENTS

| | | | |
|---|---|---|---|
| 2,755,484 | * | 7/1956 | Hotz ...................................... 160/330 |
| 3,592,256 | * | 7/1971 | Knight ............................. 160/332 X |
| 4,100,957 | * | 7/1978 | Shelton ............................. 160/368.1 |
| 4,221,256 | * | 9/1980 | Karaki ............................... 160/368.1 |
| 4,312,396 | * | 1/1982 | McKinnon et al. ................. 160/332 |
| 5,323,835 | * | 6/1994 | Bachmeier .................... 160/368.1 X |
| 5,427,169 | * | 6/1995 | Saulters ............................. 160/368.1 |
| 5,788,317 | * | 8/1998 | Nation ............................. 160/123 X |
| 5,988,256 | * | 11/1999 | Winters ........................ 160/DIG. 18 |

OTHER PUBLICATIONS

Expand Your Living Space. 8 page color brochure of Shademaster Products, Division of Best RV, Inc., 9335 Stevens Road, Santee, California, published Oct. 1998.

Expand Your Living Space and . . . , 4 page color brochure of Shademaster Products, 1104 North Marshall, EL Cajon, California; published Mar. 1988.

* cited by examiner

*Primary Examiner*—Jerry Redman
(74) *Attorney, Agent, or Firm*—Brown, Martin, Haller & McClain, LLP

(57) ABSTRACT

A screen assembly for a door opening to a cargo bay area has mounting tracks for attaching around the top and opposite sides of the door opening. A screen panel of pliable material has a shape and dimensions substantially matching those of the door opening. A bead extends along at least part of each of the opposite side edges and upper edge for engagement in the track to secure the panel in the opening. The panel has a central portion which can be rolled up and stored out of the way for access to the cargo bay.

24 Claims, 3 Drawing Sheets

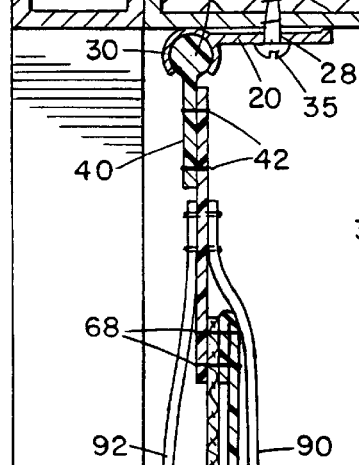
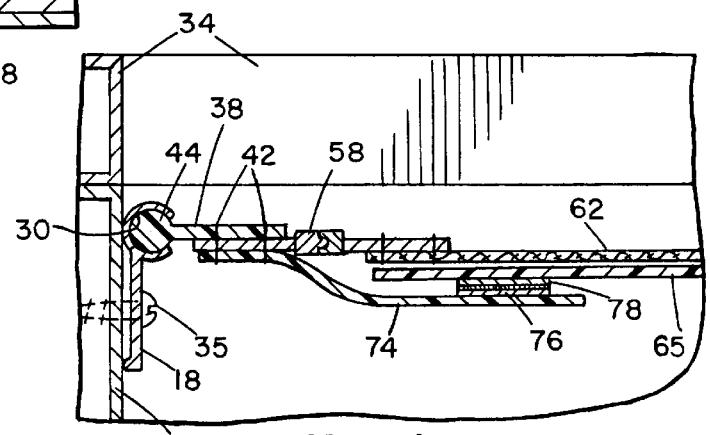
FIG. 4
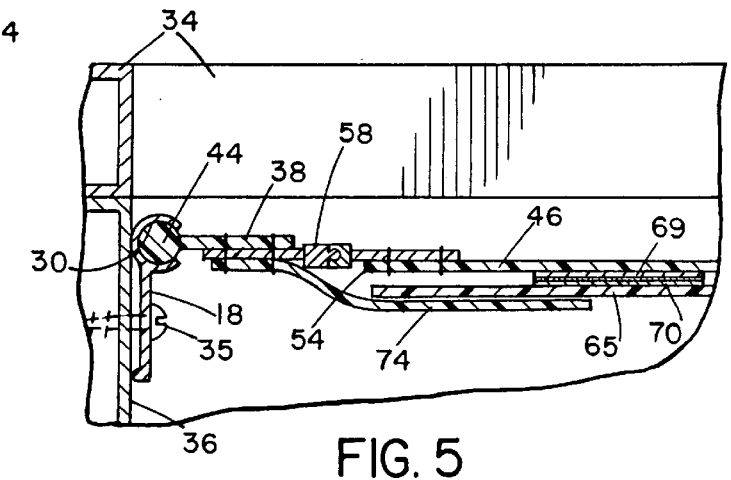
FIG. 5
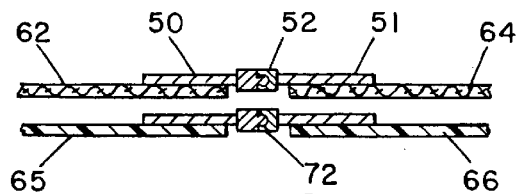
FIG. 6
FIG. 3

SCREEN ASSEMBLY FOR DOOR OPENING

BACKGROUND OF THE INVENTION

The present invention relates generally to an accessory for a motor home, recreational vehicle, truck, sport utility trailer, or the like, and is particularly concerned with a screen assembly for covering a door opening of such a vehicle when the door is open.

Sport utility trailers are often towed behind motor homes, trucks, cars, or other motor vehicles, and provide a cargo area for transporting motorcycles, bicycles, dune buggies, and the like. Such trailers have a rear door or cargo door which folds down to provide a ramp for moving the stored vehicle or vehicles out of the trailer. Sport utility trailers also often have fold away beds or the like to provide additional sleeping space when camping. Additionally, some motor homes have a built in cargo bay for carrying motorcycles, dune buggies or the like, and this will also be provided with a rear cargo door which folds down to provide a ramp.

One problem with such cargo areas is that they are exposed to the elements, insects, and the like while the cargo door is open. It is inconvenient to have to close the cargo door immediately after wheeling out the vehicles for use, and then re-open it when the vehicles are returned. Thus, people normally leave the ramp down while the stored vehicles are out. This results in the cargo bay or area being completely open at one end.

SUMMARY OF THE INVENTION

It is an object of the present invention to provide a new and improved screen assembly for covering the door opening of a cargo bay area of a sport utility trailer, motor home, or the like, while the cargo door is open.

According to one aspect of the present invention, a screen assembly for a door opening to a cargo bay area is provided, which comprises a rigid frame for attaching around the top and opposite sides of the door opening, the frame having a track which extends along at least part of each side and top of the door opening, and a screen panel of pliable material having a shape and dimensions substantially matching those of the door opening, the panel having an upper edge, opposite side edges, and a lower edge, and a bead extending along at least part of each of the opposite side edges and upper edge for engagement in the track, the panel having at least one mesh window.

Preferably, the screen panel includes a central portion having opposite sides releasably secured to the side edges, so that the central portion can be rolled up out of the way for entry and exit purposes. In one preferred embodiment, the central portion is in two halves forming separate side panels which have inner side edges which are also releasably secured together, so one side panel of the central portion only may be rolled up out of the way. Each side panel preferably has a mesh window, and a releasable cover flap for covering the window when desired. The screen panel may be made of any suitable material such as vinyl fabric or the like.

According to another aspect of the present invention, a screen assembly for a door opening to a cargo bay area is provided, which comprises a mounting device for securing around at least part of the sides and top of a door opening, and a panel for securing across the door opening, the panel having an upper edge and opposite side edges secured to the mounting device, and including at least a central panel portion having opposite sides and a releasable securing device between each side of the central panel portion and the respective panel side edge, so that the central panel portion can be released from the side edges and rolled up to the top of the door opening in a stored condition, and a securing device at the top of the panel for releasably securing the rolled up central panel portion in the stored condition.

The screen assembly of the present invention can be readily mounted inside the opening of a cargo bay door to provide a sealed wall while the cargo door is open, allowing the cargo space to be used as a room and shielding it from the elements as well as insects. The central portion of the panel can be readily rolled up out of the way when not in use or when access to the cargo bay is desired.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which:

FIG. 3 is an enlarged sectional view taken on line 3—3 of FIG. 2;

FIG. 4 is an enlarged sectional view taken on line 4—4 of FIG. 2;

FIG. 5 is an enlarged sectional view taken on line 5—5 of FIG. 2;

FIG. 6 is an enlarged section view taken on line 6—6 of FIG. 2;

DESCRIPTION OF THE PREFERRED EMBODIMENT

Figure 1:
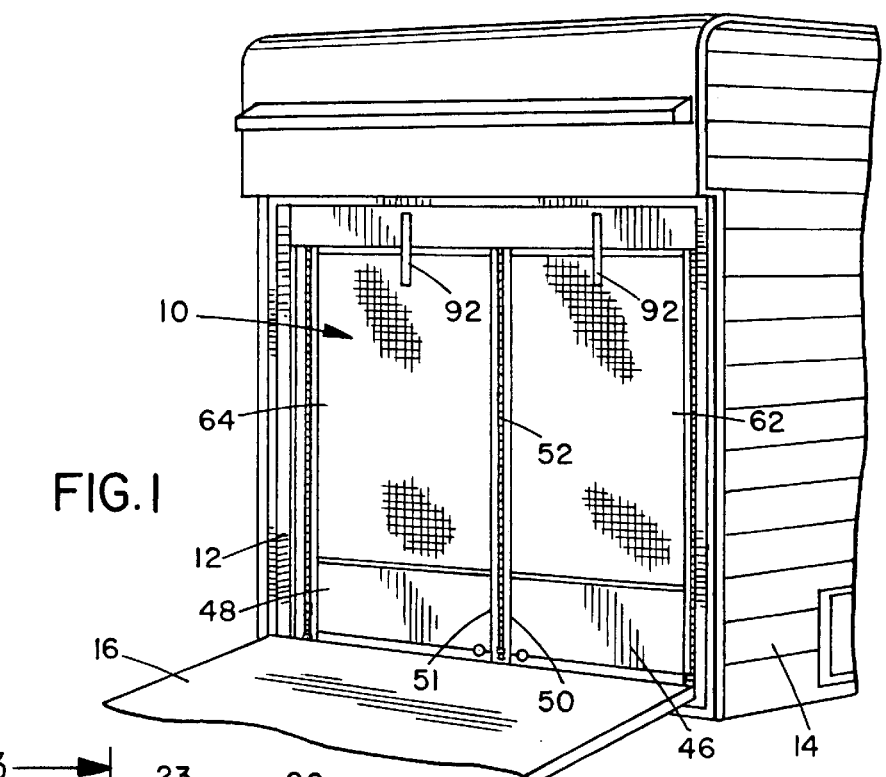
FIG. 1 is a perspective view of the rear of a cargo bay of a motor home or sports utility vehicle showing the roll up screen assembly according to a preferred embodiment of the invention installed in the cargo doorway.

FIGS. 1 to 8 illustrate a roll up screen assembly 10 according to a preferred embodiment of the invention for mounting in the door opening or doorway 12 at the rear of the cargo bay of a vehicle 14 such as a sports utility trailer for towing behind a motor vehicle, or a motor home or the like. A cargo bay door 16 is typically provided at the rear end of such a cargo bay, and can be rotated down to the position illustrated in FIG. 1 to form a ramp for removing vehicles such as motorcycles, bicycles, dune buggies, and the like from the cargo bay, and returning them to the cargo bay after use. The screen assembly of this invention is designed to cover the door opening while the cargo bay door 16 is in the open position, so that it can be left open for extended periods while the cargo space is still screened and shielded from the elements. The screen assembly is located inside the door frame 34 and does not interfere with opening or closing of the door 16.

The screen assembly 10 basically comprises a series of three linear track members or mounting plates 18,19,20 which are adapted to be secured along the opposite sides 21,22 and top 23 of the door opening 12, respectively, and a multi-part panel device 24 which is secured in the respective track members along its opposite sides and upper edge, and which covers the door opening. The track members 18,19,20, which are made of a rigid material such as metal or rigid plastic, are illustrated in more detail in FIGS. 3 to 5. Each track member 18,19,20 comprises a flat, elongated plate or bar with a series of spaced holes 28 along its length, and an arcuate groove or track 30 extending along one side edge of the plate. The upper track member 20 is secured along the roof 32 of the cargo bay adjacent the door frame 34 by a series of screws 35 extending through the spaced holes. Similarly, the side track members 18,19 are secured along the opposite side walls 36 of the cargo bay adjacent the door frame 34 via screws 35.

The multi-part panel device 24 is preferably made primarily of a suitable pliable and waterproof material such as vinyl fabric. Elongated, plastic bead members 38,39,40 are attached along opposite sides and the upper edge of the panel device, respectively, by stitching 42 or the like. Each bead member 38,39,40 has a cylindrical bead 44 extending along its outer edge for sliding engagement in the groove 30 of the respective track member 18,19,20, as illustrated in FIGS. 3 to 5. Thus, the screen assembly can be readily mounted in a doorway at the inside of a door frame.

Figure 7:
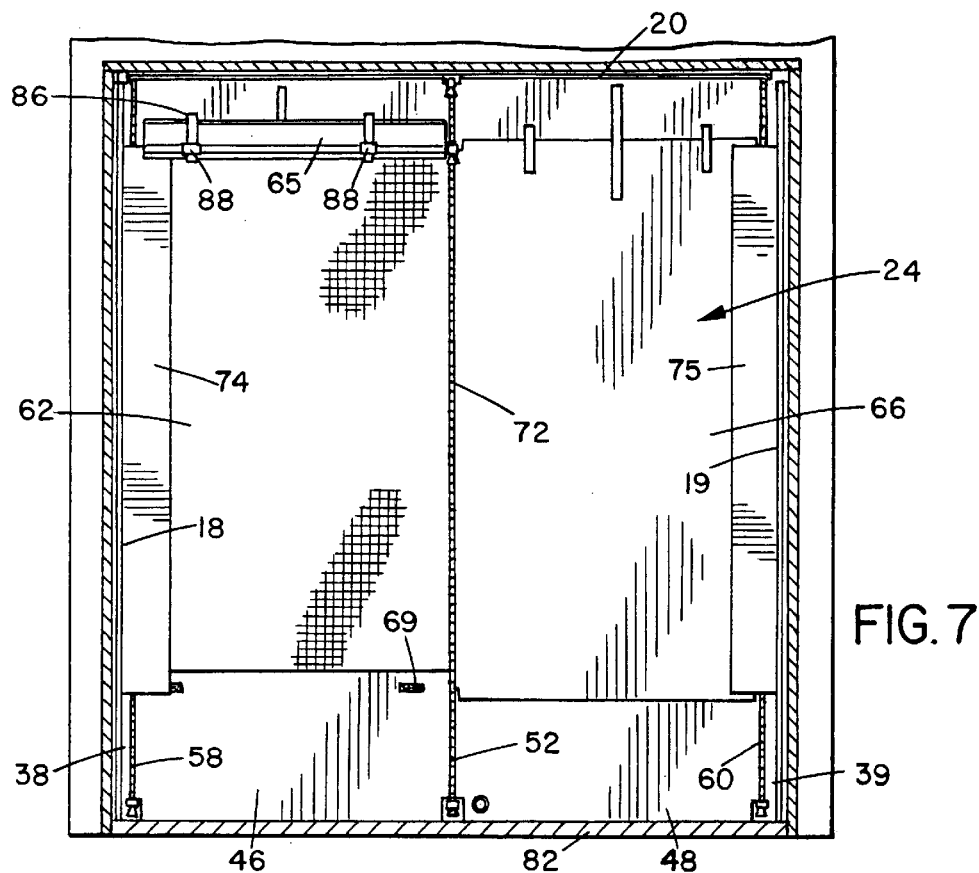
FIG. 7 is a view similar to FIG. 2, showing the inner curtain rolled up on one side.
Figure 8:
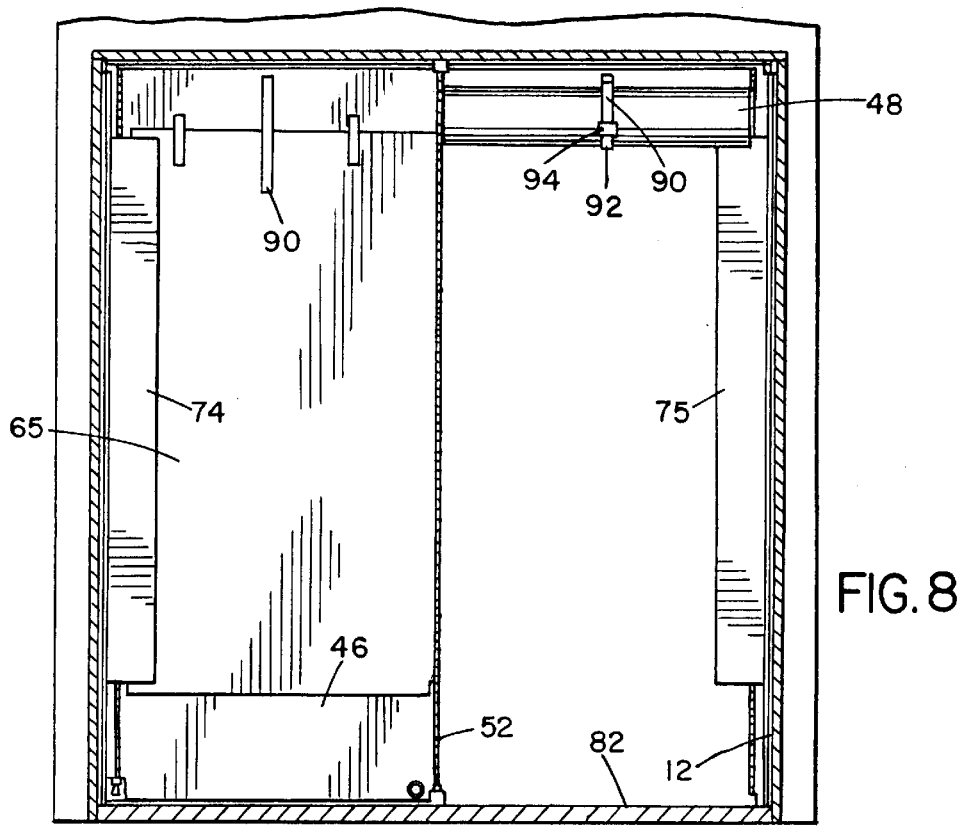
FIG. 8 is a view similar to FIG. 7, showing the complete panel rolled up on one side.

As best illustrated in FIGS. 7 and 8, the panel device basically comprises a pair of panels 46,48 having adjacent inner side edges 50,51 releasably secured together by means of a central zipper 52. Outer side edges 54,56 of the respective panels are releasably secured to the respective side bead members 39,40 by means of zippers 58,60. The upper edges of the respective panels are secured to the upper bead member 40 by stitching, as best illustrated in FIG. 3.

Each panel 46,48 has a window 62,64 formed of mesh material extending over a major portion of its area. A cover flap or curtain 65,66 is provided on the inside of the panel device for covering the mesh window 62,64, respectively, when in the lowered, deployed position of FIG. 3 and as illustrated on the left hand side of FIG. 7. Curtain 65,66 is secured along its upper edge to the upper edge of the respective window by stitching lines 68, and is releasably secured to the respective panel below the window by means of mating patches 69,70 of hook and loop type fastener material such as Velcro®, as best illustrated in FIG. 3. The curtains 65,66 are releasably secured together at their adjacent inner edges by means of a zipper 72.

Figure 2:
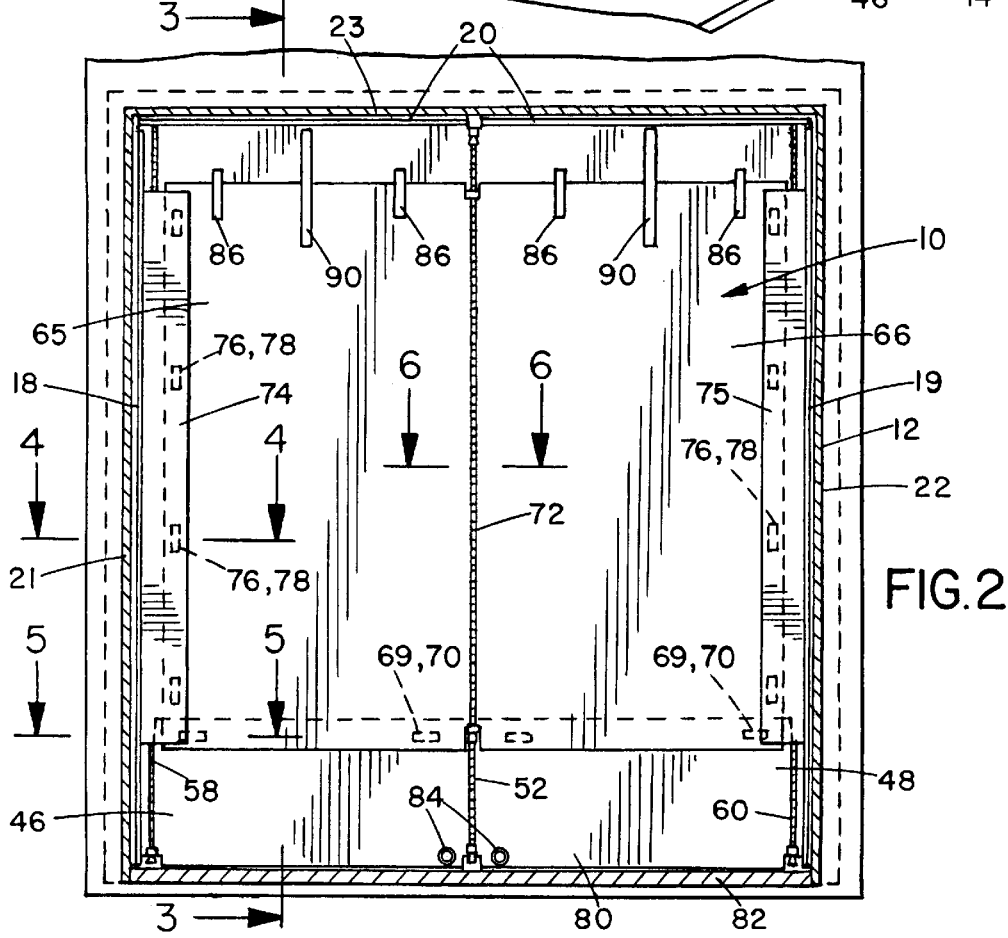
FIG. 2 is a rear view of the screen assembly as taken from inside the vehicle.

Side flaps 74,75 are secured to the respective side bead member 38,39 on the inside of the panel device, as best illustrated in FIGS. 2,5, and 6. Each side flap 74,75 extends over a side portion of the respective curtain 65,66, and can be releasably secured to the outer face of the respective curtain by a series of mating patches 76,78 of hook and loop fastener material such as Velcro®. The side flaps help to secure the curtains over the windows in the event of high wind conditions, rain, or the like.

The lower edge 80 of the panel device is not secured to the floor 82 of the cargo bay, but simply rests freely on the floor. Eyelets 84 are provided adjacent the lower edge in each side panel in case the lower edge needs to be tied down in some situations.

The screen assembly is designed so as to be usable in a variety of different possible configurations. The windows 62,64 may be completely covered and sealed by the curtains 65,66 when complete privacy and shielding from the elements is desired. Alternatively, in order to provide more fresh air or light, one or both curtains may be rolled up to the top of the window and secured via suitable fastener straps 86,87, as illustrated for the curtain 65 in FIG. 7. In order to roll up one of the curtains, such as curtain 65, the zipper 72 must first be unzipped, and the curtain must be released from the hook and loop fastener patches 69 and 76 at the lower end and side of the curtain. The curtain is then free to be rolled up to the top of the window. Two pairs of fastener straps 86,87 are preferably provided along the upper edge of each curtain, with one strap 86 of each pair being located outside the curtain, and the other strap being located between the curtain and the window. A suitable buckle or snap fastener 88 is provided for releasably securing the strap ends together to secure the curtain in the rolled up condition above the window, as illustrated in FIG. 7.

One or both panels 46,48 may also be rolled up and stored out of the way as necessary, in a similar manner to the curtains 65,66, as illustrated for panel 48 in FIG. 8. For this purpose, two pairs of fastener straps are provided at the upper end of the panel device, one pair for securing the panel 46 and the other for securing the panel 48. Each pair of panel fastener straps comprises an inner strap 90 on the inside of the panel and an outer strap 92 on the outside of the panel.

In order to roll up only one of the panels, such as panel 48, both of the zippers 52 and 72 must first be unzipped, along with one of the side zippers 60. The panel can then be completely rolled up to the top of the doorway, and secured in position via straps 90,92 which are secured together by a suitable releasable buckle or snap fastener 94. If both panels are to be rolled up to leave the entire doorway open, the two side zippers 58 and 60 are unzipped, with the zippers 52,72 remaining closed, and the panels are then completely rolled up together and secured with straps 90,92.

The screen assembly of this invention is therefore extremely versatile and easy to deploy. It can be readily mounted inside the doorway of a cargo area in any vehicle, including motor homes and sports utility trailers, simply by securing the track members around the sides and ceiling of the cargo area adjacent the door frame. Once installed, it permits the doorway to be completely screened while the cargo door is open, providing a sheltered and private room area. One side panel may be rolled up out of the way if more air is required, or both panels may be rolled up together when the doorway must be opened to allow items to be moved into and out of the cargo bay. The large windows allow light and air into the cargo area but still prevent insects and the like from entering the area, while the curtains can be rolled down and secured in the case of bad weather, or if more privacy is required.

Although a preferred embodiment of the invention has been described above by way of example only, it will be understood by those skilled in the field that modifications may be made to the disclosed embodiment without departing from the scope of the invention, which is defined by the appended claims.

I claim:

1. A screen assembly for a door opening to a cargo bay area, comprising:

a rigid mounting frame for attaching around the top and opposite sides of the door opening, the mounting frame having a track which extends along at least part of each side and top of the door opening;

a screen panel of pliable material having a shape and dimensions substantially matching those of the door opening, the panel having an upper edge, opposite side edges, and a lower edge, a side bead extending along at least part of each of the opposite side edges and an upper bead extending along the upper edge for engagement in the track to secure the panel in the door opening;

the panel including a pair of side edge portions each secured to and extending alongside a respective side bead, a separate central portion having opposite sides, and a releasable side fastener on each side of the central portion for releasably securing the side to the respective side edge portion of the panel.

2. The assembly as claimed in claim 1, wherein the panel has at least one mesh window.

3. The assembly as claimed in claim 1, wherein each releasable side fastener comprises a zipper.

4. The assembly as claimed in claim 1, including securing devices at the upper end of the panel for releasably securing the central portion of the panel in a rolled up, stored condition.

5. The assembly as claimed in claim 1, wherein the central portion comprises two separate half panels each having an inner side edge adjacent the corresponding inner side edge of the other half panel, and a releasable central fastener for releasably securing the inner side edges of the half panels together, whereby only one half panel may be selectively rolled up and stored at the top of the door.

6. The assembly as claimed in claim 5, wherein the central fastener is a zipper.

7. The assembly as claimed in claim 5, wherein each half panel has a mesh window.

8. The assembly as claimed in claim 7, including a releasable curtain for selectively covering each window, each curtain being movable between a rolled up, stored condition above the window and a deployed position covering the respective window, the curtains having adjacent inner side edges.

9. The assembly as claimed in claim 8, including releasable securing devices for releasably securing each curtain in a rolled up, stored condition.

10. The assembly as claimed in claim 8, including a releasable curtain fastener for releasably securing the inner side edges of the curtains together when in the deployed condition.

11. The assembly as claimed in claim 10, wherein the releasable curtain fastener is a zipper.

12. The assembly as claimed in claim 8, wherein each curtain has a lower end projecting below the respective window, and a releasable securing device is provided for releasably securing the lower end of the deployed curtain below the window.

13. The assembly as claimed in claim 12, wherein the releasable securing device between the lower end of the respective curtain and the respective half panel is a pair of mating patches of hook and loop fastener material.

14. A screen assembly for a door opening to a cargo bay area, comprising:

a rigid mounting frame for attaching around the top and opposite sides of the door opening, the mounting frame having a track which extends along at least part of each side and top of the door opening;

a screen panel of pliable material having a shape and dimensions substantially matching those of the door opening, the panel having an upper edge, opposite side edges, and a lower edge, and a bead extending along at least part of each of the opposite side edges and upper edge for engagement in the track to secure the panel in the door opening;

the panel including a separate central portion having opposite sides, and a releasable side fastener on each side of the central portion for releasably securing the side to the respective side edge of the panel;

the central portion comprising two separate half panels each having an inner side edge adjacent the corresponding inner side edge of the other half panel, and a releasable central fastener for releasably securing the inner side edges of the half panels together, whereby only one half panel may be selectively rolled up and stored at the top of the door;

each half panel having a mesh window;

a releasable curtain for selectively covering each window, each curtain being movable between a rolled up, stored condition above the window and a deployed position covering the respective window, the curtains having adjacent inner side edges; and a pair of side flaps on each side of the panel, one side flap extending over an outer side edge of one curtain and the other side flap extending over an outer side edge of the other curtain.

15. The assembly as claimed in claim 14, including releasable securing means for releasably securing each side flap to the respective curtain.

16. A screen assembly for a door opening to a cargo bay area, comprising:

a rigid mounting frame for attaching around the top and opposite sides of the door opening, the mounting frame having a track which extends along at least part of each side and top of the door opening; and a screen panel of pliable material having a shape and dimensions substantially matching those of the door opening, the panel having an upper edge, opposite side edges, and a lower edge, and a bead extending along at least part of each of the opposite side edges and upper edge for engagement in the track to secure the panel in the door opening; and the mounting frame comprising a series of three strips for securing along the opposite side edges and top of a door opening, respectively, each strip having a groove extending along one side edge comprising the track for releasably retaining the respective bead of the screen panel.

17. The assembly as claimed in claim 16, wherein the grooves are of part circular cross section.

18. The assembly as claimed in claim 17, wherein each bead comprises a cylindrical bead for sliding engagement in the respective groove.

19. A vehicle cargo bay, comprising:

a cargo area having a floor, a ceiling, opposite side walls, and a door opening;

a door frame in the door opening;

a door mounted in the door frame for movement between a closed position covering the door opening and an open position;

a screen assembly mounted in the door opening inside the door frame for selectively covering the door opening when the door is in the open position;

the screen assembly comprising a rigid frame having a opposite side portions secured to the side walls of the cargo area adjacent the door frame and an upper portion secured along the ceiling adjacent the door frame, and a screen panel having opposite side edges and an upper edge secured in the rigid frame;

the side portions and upper portion of the frame having tracks extending along their length;

the side edges and upper edge of the screen panel having beads slidably engaging in the tracks; and the rigid frame comprising a series of three strips for securing along the opposite side edges and top of a door opening, respectively, each strip having a groove extending along one side edge comprising the track for releasably retaining the respective bead of the screen panel.

20. A screen assembly for a door opening to a cargo bay area, comprising:

a mounting device for securing around at least part of the sides and top of a door opening, and a panel for securing across the door opening, the panel having an upper edge and opposite side edges secured to the mounting device, and including at least a pair of side edge portions extending along the respective side edges and a central panel portion having opposite sides and a releasable securing device between each side of the central panel portion and the respective panel side edge portion, so that the central panel portion can be released from the side edge portions and rolled up to the top of the door opening in a stored condition, and a securing device at the top of the panel for releasably securing the rolled up central panel portion in the stored condition;

each side portion being narrower than said central panel portion; and the central panel portion comprising two separate half panels, each half panel having an inner side edge adjacent the corresponding inner side edge of the other half panel, and a releasable central fastener for releasably securing the inner side edges of the half panels together, whereby only one half panel may be selectively rolled up and stored at the top of the door.

21. The assembly as claimed in claim 20, wherein the central fastener is a zipper.

22. The assembly as claimed in claim 20, wherein each releasable securing device comprises a zipper.

23. The assembly as claimed in claim 20, wherein each half panel has a mesh window.

24. The assembly as claimed in claim 23, including a releasable curtain for selectively covering each window, each curtain being movable between a rolled up, stored condition above the window and a deployed position covering the respective window, the curtains having adjacent inner side edges.

* * * * *